United States Patent [19]

Barlow

[11] Patent Number: 4,901,226
[45] Date of Patent: Feb. 13, 1990

[54] INTER AND INTRA PRIORITY RESOLUTION NETWORK FOR AN ASYNCHRONOUS BUS SYSTEM

[75] Inventor: George J. Barlow, Tewksbury, Mass.

[73] Assignee: Bull HN Information Systems Inc., Billerica, Mass.

[21] Appl. No.: 129,277

[22] Filed: Dec. 7, 1987

[51] Int. Cl.$^4$ .............................................. G06F 13/36
[52] U.S. Cl. ................................ 364/200; 364/240.1; 364/240.2; 364/240.4; 364/242.9
[58] Field of Search ... 364/200 MS File, 900 MS File

[56] References Cited

U.S. PATENT DOCUMENTS

| | | | |
|---|---|---|---|
| 4,006,466 | 2/1977 | Patterson et al. | 364/200 |
| 4,296,464 | 10/1981 | Woods et al. | 364/200 |
| 4,373,183 | 2/1983 | Means et al. | 364/200 |
| 4,387,425 | 6/1983 | El-Gohary | 364/200 |
| 4,604,685 | 8/1986 | Brown et al. | 364/200 |

Primary Examiner—Eddie P. Chan
Attorney, Agent, or Firm—Faith F. Driscoll; John S. Solakian

[57] ABSTRACT

A data processing system includes a plurality of units including a bus interface unit (BIU), each of which couple in common to different positions along an asynchronous common system bus. The BIU couples to a plurality of local units which connect to a high speed local bus. The asynchronous common system bus includes a distributed tie-breaking network which consists of a plurality of like priority network sections. The BIU includes a priority resolver which incorporates the priority network section having the highest priority access to the asynchronous bus. The priority resolver includes a local priority resolver circuit for resolving priorities between local requestors within a minimum amount of time. The priority network section and local priority resolver circuit are interconnected so that the signal generated by the network section request circuits to request use of the asynchronous bus is applied to the local priority resolver circuit and to the common bus at the same time. This permits both bus resolution cycles for resolving external and internal requests to proceed in parallel. Thus, access to the system bus will always be resolved within a single bus resolution cycle of operation.

30 Claims, 4 Drawing Sheets

INTER AND INTRA PRIORITY RESOLUTION NETWORK FOR AN ASYNCHRONOUS BUS SYSTEM

RELATED APPLICATIONS

1. "Bidirectional Control Signalling Bus Interface Apparatus for Transmitting Signals Between Two Bus Systems", invented by George J. Barlow, Ser. No. 07/129,278, Filed on Dec. 7, 1987.

BACKGROUND OF THE INVENTION

1. Field of Use

This invention pertains to apparatus for resolving access to an asynchronous bus on a priority basis. More particularly, it pertains to resolving priorities between a plurality of intra or local requestors for access to the asynchronous bus shared by a plurality of inter or external requestors.

2. Prior Art

There are several U.S. patents of this inventor for a distributed tie-breaking network included in an asynchronous bus system of the type found in the present invention. These include U.S. Pat. No. 4,096,569 which issued on June 20, 1978 and U.S. Pat. No. 4,559,595 which issued on Dec. 17, 1985.

U.S. Pat. No. 4,096,569, the priority logic circuits of the distributed tie-breaking network grants bus cycles and resolves simultaneous requests to use the bus on the basis of a unit's physical position on the bus with the lowest priority being given to the last unit on the bus located at the opposite end of the bus. U.S. Pat. No. 4,559,595 discloses an improvement to the priority logic circuits of U.S. Pat. No. 4,096,569. The priority logic circuits are modified to allow the lowest priority (i.e., the last unit) to be physically at other than its lowest priority position.

Additionally, there are several patents and patent applications of the same assignee which disclose arrangements for resolving the allocation of a shared resource on a priority basis. These include U.S. Pat. No. 4,493,036 invented by Daniel A. Boudreau and Edward R. Salas which issued on Jan. 8, 1985, U.S. Pat. No. 4,600,992 which issued on July 15, 1986 and the copending patent application of Richard A. Lemay entitled, "Tandem Priority Resolver" bearing Ser. No. 07/030,328, filed on Mar. 26, 1987.

In U.S. Pat. Nos. 4,493,036 and 4,600,992, priority resolver logic circuits are provided within a main memory to resolve possible conflicts between competing requests for access to memory. The patent discloses priority resolver logic in which the lowest priority requestor has the shortest logical path through the resolver logic. The patent teaches that in a priority resolver, it is also desirable, particularly when resolving competing requests for access to main memory to be able to initiate a cycle as early as possible even before the final resolution as to which one of the completing requests will be granted access to the shared resource. This is accomplished by ORing together all of the outputs of the requestors grant flip-flops, each of which is set at the beginning of each priority resolution cycle when the associated requestor has requested use of the shared resource. The signal resulting from such ORing provides an early shared resource initiate signal that indicates that at least one priority level has requested use of the shared resource even though the final winner has not yet been determined. This signal is used to initiate a cycle within the shared resource even before the final priority winner is determined.

U.S. Pat. No. 4,493,036 discloses a priority resolver which is similar to that of U.S. Pat. No. 4,600,992. Additionally, the disclosed priority resolver provides for the dynamic adjustment of the priority level among competing requests as conditions require.

In the case of both U.S. Pat. Nos. 4,493,036 and 4,600,992, the priority logic circuits for resolving the allocation of the shared memory resource on a priority basis are used in addition to the priority network which is used to resolve completing requests for use of the system's common bus. What this has meant is that the priority resolution of competing requests for access to the common bus which can be viewed as a resource external to the system and the priority resolution of competing requests by internal to the system have proceeded in tandem or in series.

More specifically, a similar approach to ORing internal competing requests for use of the common bus has been used to generate a type of early shared resource signal. This signal was then used to initiate a bus cycle before the completion of the resolution cycle. However, only after the bus has been won or access has been granted is the priority resolution of competing requests from units internal to the system (e.g. units located on the same board) has been allowed to take place.

This separate treatment of resolving competing requests from internal requestors and external requestors has increased the time required for granting access to a common bus in systems in which both external and internal requestors must compete for access to such common bus. The total access time has been the sum of both priority resolution cycles.

The above referenced Lemay copending patent application discloses an arrangement for reducing the amount of time for resolving competing requests performed in priority resolution circuits in a serial fashion. This is accomplished by including means in a first priority resolver circuit associated with an adapter which generates an initial access request signal as an input to a second priority resolver circuit associated with a memory before the first circuit has decided which source has been granted access.

The patent application discloses that the arrangement of Lemay can also be used in resolving competing requests for access to the system bus via an adapter. This means that a priority resolver circuit similar to the second priority resolver circuit is used to combine the requests received from the local requestors into a single request signal. This request signal is forwarded to the system bus while the resolver circuit decides which local requestor was to be granted priority when it was established by the bus priority resolver circuit that the adapter has been granted access to the system bus.

While the arrangement in Lemay decreases the amount of time for resolving requests required to be passed through both priority resolver circuits, there is still a finite amount of time required to be expended in partially resolving requests first on a local or internal level prior to initiating the request for system bus access. The total time in this system calculates to be approximately one-half of the local resolution cycle and the bus resolution cycle. Furthermore, the Lemay arrangement for resolving priorities of competing local requests is not easily expanded in terms of the number of requestors.

The above disadvantages in terms of speed and expandability result in reduced system performance and increased complexity. This is particularly true in those computer organizations which are required to service requests from a plurality of units which connect in common to a high speed local bus. In such instances, delays in accessing the system bus become cumulative resulting in substantial decreases in system performance.

Accordingly, it is a primary object of the present invention to provide an improved priority resolver for resolving priorities between competing internal or local requests for granting access to an external resource on the basis of the requestor's physical position on the bus relative to other competing requestors which connect to the bus.

It is a more specific object of the present invention to provide an arrangement for resolving competing requests for use of an asynchronous bus from both local and external requestors within a minimum of time.

SUMMARY OF THE INVENTION

The above objects are achieved in a preferred embodiment of a bus priority resolver constructed according to the teachings of the present invention. The bus priority resolver is used in a data processing system which has a plurality of units, including a bus interface unit (BIU), each of which couple to different physical positions along an asynchronous common system bus. In the preferred embodiment, the BIU couples to a plurality of local units which in turn connect in common to a high speed local bus.

The asynchronous system bus includes a distributed tie-breaking priority network which consists of a plurality of like priority network sections. The bus priority resolver of the present invention incorporates the priority network section which has the highest positional priority access to the asynchronous system bus. The priority network section is constructed so as to be easily expandable for accommodating requests from a maximum number of local units. Additionally, the bus priority resolver includes a local priority resolution circuit for generating an output signal for indicating when the highest priority local unit has been granted access to the common bus.

According to the present invention, at the earliest point of the priority resolution cycle of the bus priority resolver corresponding to when a request signal is generated for signalling a request to use the bus, this same request signal is applied to the local priority circuit to initiate simultaneously, a local bus priority resolution cycle. The local priority resolution circuit is constructed to resolve priority between competing local or internal requests within a minimum amount of time. This minimum time is selected to be just long enough to permit any related operations to be performed, such as parity generation, to filter out any spikes and to resolve the competing local requests.

The invention utilizes the same request signal generated by the bus priority resolver to request the use of the asynchronous bus. This permits the priority resolution of competing external requests by the bus priority resolver and by the local priority resolution circuit to proceed in parallel. This ensures that access to the system bus will always occur within a single system bus resolution cycle of operation. Following the minimum resolution time of the local priority resolution circuit, the generated output signal is used to set a common grant flip-flop denoting that one of the local units has been granted use of the bus. The identity of the local unit is obtained directly from the bus priority network section request flip-flops.

Additionally, the preferred embodiment permits certain types of local units (e.g. CPU) to specify how its request is to be processed. That is, the local unit can specify whether the request has a high or low priority. This facilitates the processing of requests as well as enabling the BIU to exploit fully its high priority positioning on the asynchronous common bus. Also, as in some prior art systems, BIU can service both high and low priority requests from memory and CPU local units.

The arrangement of the present invention minimizes the time required for resolving priorities heretofore resolved in series or partially in series in prior art systems. Thus, the present invention ensures that a local unit is granted use of the bus within a single system bus resolution cycle of operation. It also includes the expansion capability of prior systems and maximizes the use of existing bus tie-breaking priority networks.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE PREFERRED EMBODIMENT

Figure 1:
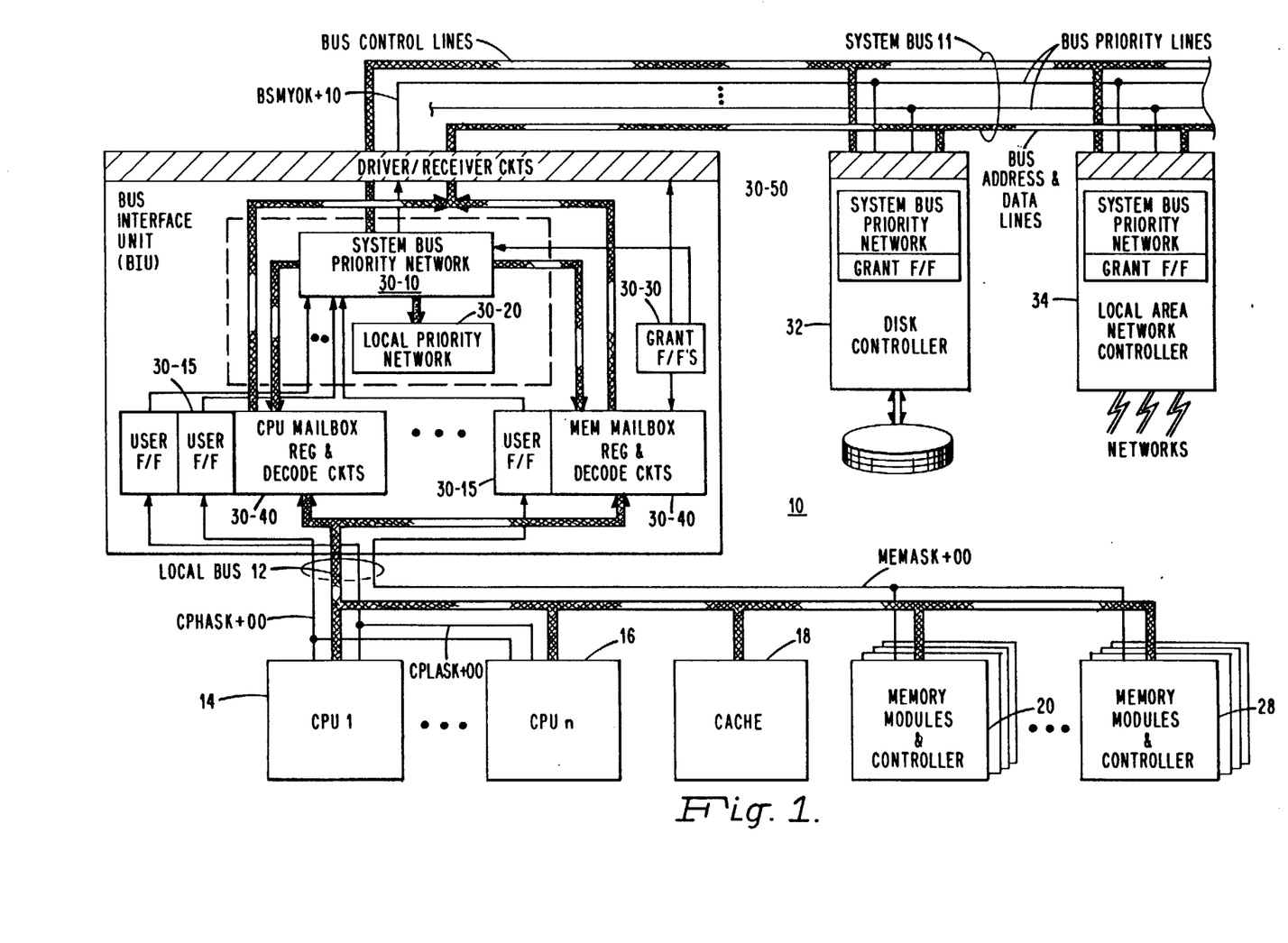
FIG. 1 is a block diagram of a preferred embodiment of a data processing system which includes the apparatus of the present invention.

FIG. 1 shows a data processing system 10 which includes a plurality of identical central processing units (CPUs) 14 through 16, a cache memory 18 and a plurality of memory controllers 20 and 28, each of which controls the operation of a number of memory modules included therein. All of these units couple in common to a high speed local bus 12 as shown.

The high speed local bus 12 couples through a bus interface unit (BIU) 30 to a system bus 11. As shown, a plurality of different subsystems also couple in common to system bus 11. The illustrative different subsystems include a disk controller 32 and a local area network controller 34. Each of the subsystems and BIU 30 includes an interface area which enables the unit or units associated therewith to transmit or receive requests in the form of commands, interrupts, data or responses/status to another unit of system bus 11 in an asynchronous manner.

The system bus 11 further includes a termination network, not shown, located at the left end of bus 11. This network defines the high priority end of bus 11. In the system configuration shown, BIU 30, which is positioned next to the termination network, has the highest priority.

As in the referenced prior art bus systems, bus priority decreases as a function of each unit's distance from the left end (i.e., termination network). Typically, in such prior art bus systems, the memory is given the highest priority and the central processing unit is given the lowest priority, since it has the lowest real time constraints in contrast with the other units positioned on the system bus as a function of their performance requirements. However, since the CPU is the heaviest user of the bus, it is desirable that it be positioned as close to memory as possible. Accordingly, in certain prior art systems, the CPU interface circuits are modified to allow a lowest priority CPU to be physically positioned on the system bus next to the system's memory subsystem. This type of arrangement is described in the above referenced patents such as U.S. Pat. No. 4,559,595.

The BIU 30 has a modified interface which also allows it from the point of use of system bus 11 to be viewed logically as if it were connected to the other end of the bus 11. Thus, it includes the same type of functionality as mentioned above while applying it in a different fashion in terms of being able to service requests applied to local bus 12 from the n plurality of CPUs 14 through 16 and the different memory units 18 through 28.

It will be seen from FIG. 1, that the plurality of CPUs 14 through 16, each connect in common to a high priority request line CPHASK; and to a low priority request line CPLASK of local bus 12. This allows each CPU to make both low and high priority requests. Further, for the purposes of the present invention, local bus 12 operates in a synchronous manner and at a substantially faster rate than system bus 11. Thus, in this two tier or level system, it becomes even more essential to reduce the time required to resolve the priority of requests from local units competing for access to system bus 11. That is, with the fast bus cycle times of local bus 12, any additional delay in accessing system bus 11 could have a substantial impact on overall system performance.

The BIU 30, according to the present invention, includes a system bus priority network 30-10, a local priority network 30-20, a plurality of user flip-flops 30-15 and common user grant flip-flops. Additionally, BIU 30 includes a plurality of blocks 30-40, each having a mailbox register and decoder circuit. Each block 30-40 further includes at least one user flip-flop 30-15. Each mailbox register is connected to receive and store at least one request in the form of a command or data applied to local bus 12 by a CPU or memory unit.

In the present system, the left most block 30-40 is used exclusively as a CPU mailbox for both high and low priority requests received from any one of the n CPU's. As such, it includes both high priority and low priority requests flip-flops 30-15 and low priority request flip-flops which are connected to receive the request signals CPHASK+00 and CPLASK+00 from any one of the CPUs 14 through 16 which enables the accompanying request applied to local bus 12 to be loaded into the corresponding mailbox register 30-40. The right most block 30-40 is used as a memory mailbox for high priority memory requests. It includes a user flip-flop which is connected to receive request signal MEMASK+00 from any one of the memory controllers 20 through 28 which enables the accompanying request to be loaded into the corresponding mailbox register 30-40.

Also, as shown in FIG. 1, the outputs of each mailbox register 30-40 are connected to be applied to system bus 11 via a common set of driver circuits included in block 30-50. While the outputs of each mailbox register connect in common, only one of the mailbox registers, which is designated by the system priority network 30-10 to have been granted access to system bus 12, will be enabled to apply signals to the driver circuits of block 30-50.

As explained in greater detail herein, signals received directly from the system priority network 30-10, together with any other required signals, are decoded by the decoder circuits included as part of the mailbox register. The output from the decoder circuit of the designated requestor is used to enable the requestor's mailbox register for applying the request to system bus 12 upon the setting of grant flip-flop 30-30. At the same time, the remaining mailbox registers are disabled from applying output signals. This can be implemented through the use of tristate registers as is well known in the art. However, no further details as to the specific implementation of the mailbox registers are deemed necessary for an understanding of the present invention.

Figure 2:
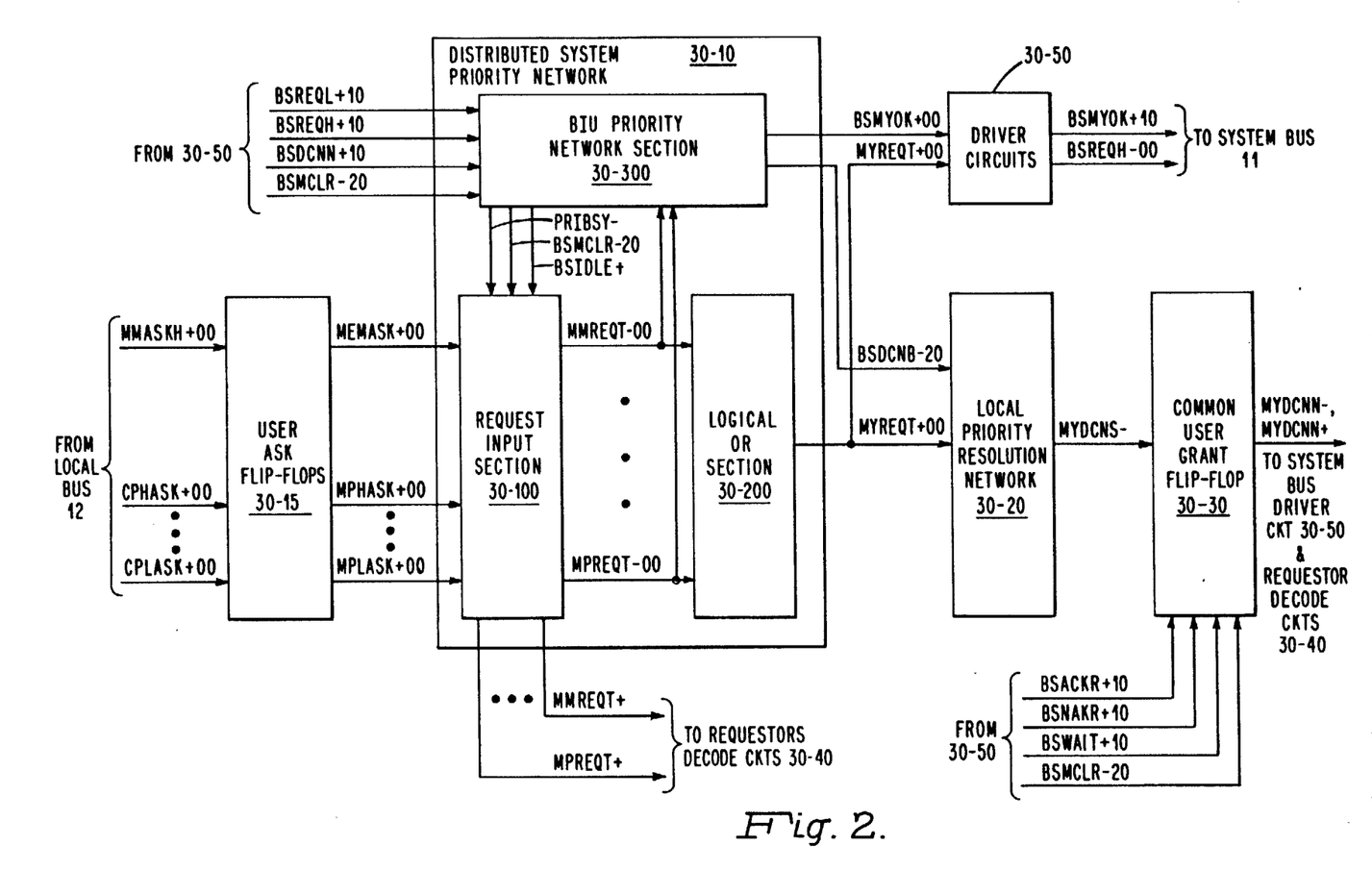
FIG. 2 illustrates in block diagram form, the apparatus of the present invention.

FIG. 2 shows in block diagram form, the organization of the system priority network 30-10 of FIG. 1. The network 30-10 serves as the interface between system bus 11 and the local bus user requestor units. As seen from the Figure, the priority network 30-10 includes a request input section 30-100, a logical OR section 30-200 and a priority network section 30-300. The request input section 30-100 serves as the primary user interface. As such, it receives request signals from any one of user ask flip-flops which are included within the blocks 30-15.

In the system of FIG. 1, there are three users or requestors which can apply request signals MEMASK+00, MPHASK+00 and MPLASK+00 as inputs to section 30-100, in response to local bus request signals MYIACK+00, CPHASK+00 and CPLASK+00. In response to user requests, section 30-100 generates a corresponding number of output request signals MMREQT−00 and MPREQT−00 which are applied as inputs to logical OR section 30-200. The same signals are also applied as inputs to priority network section 20-300.

Additionally, section 30-100 applies output signals designating which user or requestor has been granted access to system bus 11. These signals are derived directly from the states of the request flip-flops included in section 30-100 as explained herein in greater detail. In the system of FIG. 1, these signals correspond to signals MMREQT+ and MPREQT+ which are applied to decoder circuits of blocks 30-40. As explained herein, since there are signals which uniquely designating memory and CPU requestors, these signals can be used directly to identify the requestor which has been granted access to system bus 11.

The request input section 30-100 also receives bus and priority network signals from priority network section 30-300. These include signals bus data cycle now signal BSDCNN−20, bus idle signal BSIDLE+00, priority network busy signal PRIBSY−00 and bus master clear signal BSMCLR−20. Priority network section 30-300 forms a part of the distributed priority network of system bus 11 and operates as the other sections to resolve conflicts between competing external requests received in the form of signals BSREQL+10 and BSREQH+10 for access to system bus 11.

Based upon any conflict, priority network section 30-300 generates signals PRIBSY−00 and BSMYOK+10. The signal BSMYOK+10 when forced to a binary ONE signals that BIU 30 is granting permission to use system bus 11 to any other unit of lower priority. This signal is applied as one of the physically skewed or diagonal lines corresponding to the set of priority network signals used by each unit connected to system bus 11. For further information as to how the distributed priority network is constructed, reference may be made to U.S. Pat. No. 4,096,569 and the article titled, "Extending the Megabus" by Jim Jendro, published in the September, 1983 issue of the publication MINI-MICRO SYSTEMS.

Additionally, priority network section 20-300, in response to bus data cycle now signal BSDCNN+10, generates a bus delayed signal BSDCNB−20 which is applied as an input to logical OR section 30-200. As shown, the logical OR section 30-200 generates an output request signal MYREQT+00 by logically ORing together the input signals MMREQT−00 and MPREQT−00. The signal MYREQT+00 is generated at the earliest possible time and is simultaneously applied to system bus 11 and to local priority resolution network 30-20. As explained herein, this allows the resolution of both external and internal or local requests to proceed in parallel. This ensures that access to system bus 11 by the highest priority local unit takes place within a single system bus resolution cycle of operation.

As seen from FIG. 2, local priority bus resolution network 30-20, in response to signals MYREQT+00 and BSDCNB−20, generates as an output, my data cycle now set signal MYDCNS−00. As explained herein, this signal is generated within a minimum of time which also permits the requesting local unit to carry out and complete whatever operations it requires, so that it can immediately access the system bus 11 at the end of the system bus resolution cycle.

The signal MYDCNS−00 is used to set the shared or common user grant flip-flop of block 30-30. This results in the generation of my data cycle now grant signal MYDCNN+10 which is in turn applied to system bus 11 via one of the driver circuits of block 30-50. The grant signal MYDCNN+10 is also applied to an enabling input of the appropriate bus address and data driver circuits for applying the local request from the mailbox register of the highest priority local unit.

As shown, grant flip-flop 30-30 also receives bus acknowledgement, negative acknowledgement and wait response signals BSACKR+10, BSNAKR+10 and BSWAIT+10 as inputs, in addition to bus master clear signal BSMCLR−20. These signals are used to reset the user grant flip-flops 30-30 in a conventional manner following the receipt of a response to the transmitted request by the unit designated in the request. In the system of the preferred embodiment, as explained herein, the system bus 11 communication proceeds on a master-slave basis. That is, any unit desiring to communicate requests a bus cycle which is granted on a priority basis. When the bus cycle is granted, that unit becomes the master and may address any other unit on system bus 11 as the slave.

The addressed or slave unit can make any one of the above three possible responses (i.e., ACK, NACK or WAIT). Any one of these responses causes the grant flip-flop 30-30 to be reset. For further information regarding these responses, reference may be made to the above discussed patents as well as U.S. Pat. No. 4,559,595.

Figure 3:
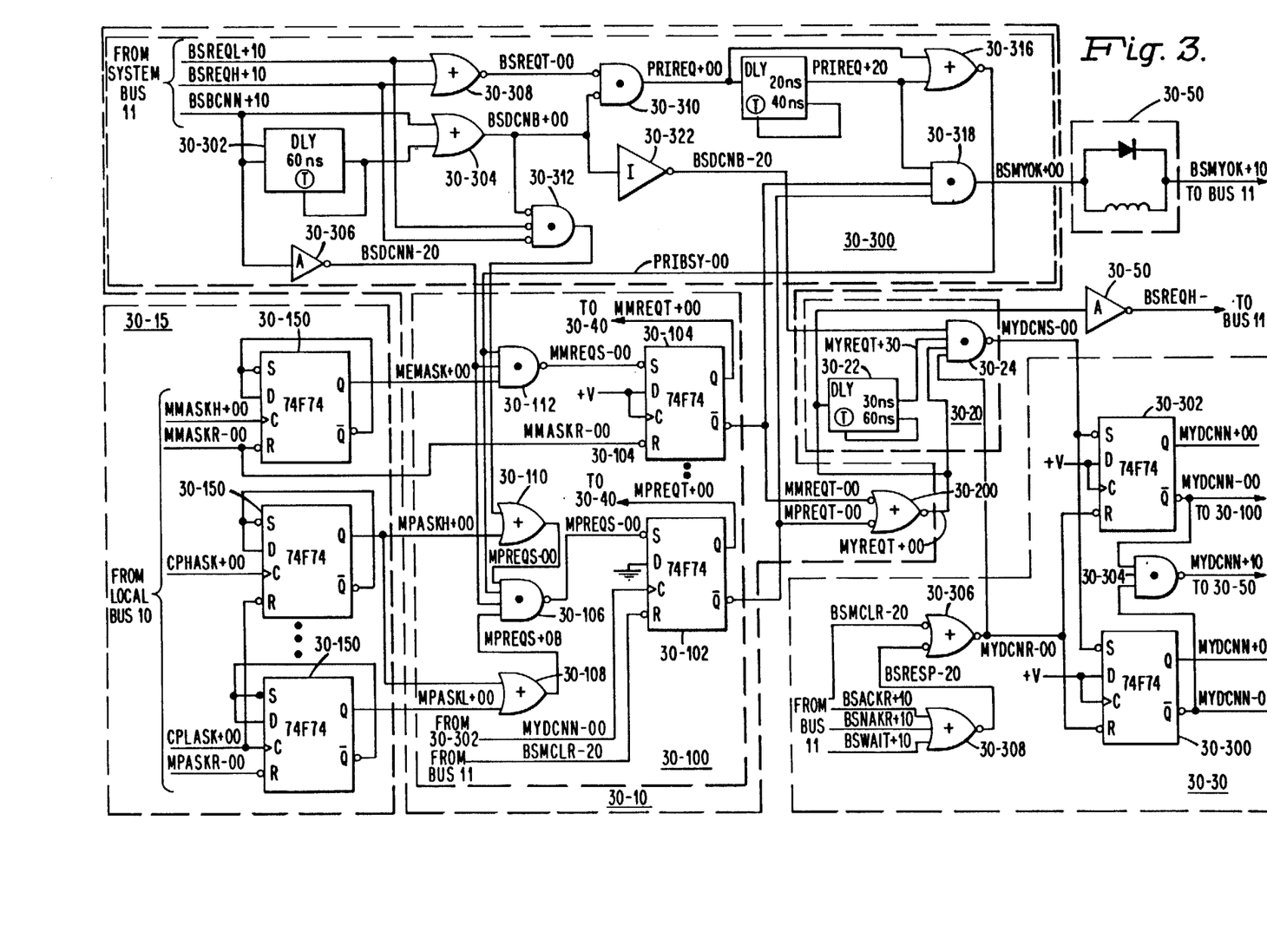
FIG. 3 shows in greater detail, the apparatus of FIG. 2.

DETAILED DESCRIPTION OF PRIORITY RESOLUTION APPARATUS OF FIG. 3

FIG. 3 shows in greater detail, each of the blocks of FIG. 2. Referring to that Figure, it is seen that block 30-15 includes the user flip-flops for the plurality of local CPUs 14 through 16 and memory controllers 20 through 28. More specifically, a first memory user flip-flop 30-150a is connected to be set to a binary ONE state in response to a memory ask signal MMASKH+00 generated by any one of the memory controllers 20 through 28. Similarly, it is reset to a binary ZERO state when signal MMASKR−00 is forced to a binary ZERO upon the completion of the memory request.

The second user flip-flop 30-150b is connected to be set to a binary ONE state in response to a CPU user high priority system bus request signal CPHASK+00 received via bus 10 from any one of the local CPUs 14 through 16. The third user flip-flop 30-150c is connected to be set to a binary ONE state in response to a CPU user request low priority system bus request signal CPLASK+00 received from any local CPUs 14 through 16. Both flip-flops 30-150b and 30-150c are reset to binary ZEROS in response to signal MPASKR−00 being forced to a binary ZERO state. Signal MPASKR−00 is forced to a binary ZERO when processing of the request has been completed.

BIU PRIORITY NETWORK 30-10

As shown, the priority network section 30-300 includes a sixty (60) nanosecond delay circuit 30-302 which is connected to delay bus data cycle now signal, BSDCNN+10, received from system bus 11 prior to being applied as one input an OR gate 30-304. The sixty (60) nanosecond period enables the highest priority requesting unit to utilize the next bus cycle without interference. At the same time, the receiving unit or slave uses this signal as a synchronizing signal. The OR gate 30-304 combines signal BSDCNN+10 and the output of delay circuit 30-302 to produce a strobe signal BSDCNB+00. This signal is used to clear the priority network section 20-300 between system bus cycles. This strobe signal delayed 60 nanoseconds from the positive edge of bus data cycle now signal, BSDCNN+10. Also, an inverter circuit 30-306 inverts signal BSDCNN+10 to generate signal BSDCNN−20 which is used to prevent the setting of the memory and CPU request flip-flops 30-102 and 30-104 of section 30-100 during a current system bus cycle of operation preventing any interference.

A NOR gate 30-308 combines bus high priority and low priority request signals BSREQH+10 and BSREQL+10 to generate bus request signal BSREQT−00. When signal BSREQT−00 switches from a binary ONE to a binary ZERO, it causes inverting AND gate 30-310 to force priority network request signal PRIREQ+00 to a binary ONE in the absence of signal BSDCNB+00. Signal PRIREQ+00 remains a binary ONE until signal BSDCNB+00 is forced to a binary ONE.

The signal PRIREQ+00 defines when the distributed system priority network of bus 11 switches from an idle state to a busy state. That is, signal PRIREQ+00 is applied to a twenty (20) nanosecond delay circuit 30-314 which generates signal PRIREQ+20 which causes a NOR gate 30-316 to hold prinet busy signal PRIBSY−00 at a binary ZERO indicative of a busy state. Signal PRIBUSY−00 prevents storage of any requests by section 30-100 generated by the local units user during a priority network resolution cycle. The 20 nanosecond delay 20-314 includes sufficient delay to compensate for the propagation delays of circuits 30-316, 30-112/30-106 and 30-104/30-102.

Signal PRIREQ+20 also causes an AND gate 20-318 to force bus my OK signal BSMYOK+00 to a binary ONE in the absence of a system bus request having been received by BIU 30 (i.e., signals MMREQT−00 and MPREQT−00 are binary ONES). Signal BSMYOK+00 is applied via a diode and inductor filter/slope control circuit included in driver circuit 30-50 to system bus 11. Signal BSMYOK+00 allows the other I/O units (i.e., controllers 32 and 34) to win access to system bus 11 if BIU 30 has not received a request after a 20 nanosecond delay established by delay circuit 30-314. That is, signal BSMYOK+00 is applied to line BSMYOK of the nine skewed lower priority network lines to indicate to the next lower priority unit (i.e., controller 32) and succeeding lower priority units (i.e., controller 34) that there is no higher priority unit which is requesting use of the next bus cycle thereby allowing all such lower priority units to use the next bus cycle. That is, signal BSMYOK+10 is one of the priority signals which are applied as input to the grant flip-flop of each lower priority unit.

As shown, signal BSDCNB+00 is applied via an inverter circuit 20-322 as an input to local priority network 30-20. Signal BSDCNB−20 prevents the setting of the grant flip-flop 30-30 during the period of time that each of the priority network sections are being cleared. Signal BSDCNB+00 is also applied as one input of an inverting AND gate 30-312. Gate 30-312 forces bus idle signal BSIDLE+00 to a binary ONE in the absence of a request from any unit coupled to system bus 11 (i.e., signals BSREQL+10 and BSREQH+10 are binary ZEROS) during the time interval when the priority network sections are not being cleared (i.e., signal BSDCNB+00 is a binary ZERO). Signal BSIDLE+00 as explained herein allows BIU 30 to have the lowest priority on the system bus 11 while being positioned at the highest priority end of system bus 11.

As seen from FIG. 3, Request Input Section 30-100 includes a main memory (MM) request flip-flop 20-104 and a microprocessor (MP) request flip-flop 20-102. Both flip-flops 30-102 and 30-104 are implemented by 74F type flip-flop elements so as to reduce any possibility of oscillation produced by the occurrence of an asynchronously applied input signal having a minimum width. Memory request flip-flop 30-104 is set to a binary ONE state when a NAND gate 30-112 forces signal MMREQS−00 to a binary ZERO. This occurs when the priority network section 30-300 is not busy (i.e., signal PRIBUSY−00 is a binary ZERO indicating that the section 30-300 is in the midst of a priority resolution cycle), and memory ask flip-flop 30-150a is in a binary ONE state (i.e., signal MEMASK+00=1). Memory request flip-flop 30-104 is reset to a binary ZERO state in response to signal MMASKR−00 being forced to a binary ZERO by the corresponding local unit. As explained herein, the main memory request signal MMREQT+00 has the highest priority on system bus 11 by the positioning of BIU 30 within the highest bus socket location.

The microprocessor (MP) request flip-flop 30-102 is set to a binary ONE state when a NAND gate 30-106 forces signal MPREQS−00 to a binary ZERO. This occurs when priority network section 30-300 is not busy (i.e., signal PRIBUSY−00=1), there is no current system bus cycle in progress (i.e., signal BSDCNN−20=1) and both auxiliary function signals MPREQS+OA and MPREQS+OB are binary ONES. An OR gate 30-110 forces signal MPREQS+OA to a binary ONE when either system bus 11 is in an idle state (i.e., signal BSIDLE+00=1) or high priority microprocessor ask flip-flop 30-150b has been set to a binary ONE (i.e., signal MPASKH+00=1). An OR gate 30-108 forces signal MPREQS+OB to a binary ONE when either the high priority or low priority microprocessor ask flip-flops 20-150b and 20-150c is set to a binary ONE (i.e., signal MPASKH+00 or MPASKL+00=1). The microprocessor flip-flop 30-102 has its data input terminal connected to ground so as to be reset to a binary ZERO on the trailing edge of signal MYDCNN−00 in the absence of any high priority or low priority microprocessor request (i.e., signal MPREQS−00 is a binary ZERO).

The output signals MMREQT−00 and MPREQT−00 from request input section 30-100 are applied as inputs to the CPU and memory mailbox register circuits 30-40 for designating which local unit has been granted access as explained herein. Additionally, signals MMREQT−00 and MPREQT−00 are applied to the inverting inputs of an OR gate of logical OR section 30-200. Gate 30-200 logically OR's both request signals to produce a resulting my request output signal MYREQT+00. The signal MYREQT+00 is simultaneously applied as an input to local priority network 30-20 and to system bus 11 via an inverter driver circuit of block 30-50 and line BSREQH−.

As shown, my request signal MYREQT+00 is applied to a 30 nanosecond local priority resolver delay circuit 30-22. The delay circuit 30-22 defines the minimum time required for resolving any conflicts between memory and CPU requests on a priority basis. The delay circuit 30-22 also filters out any spikes produced by request signals MMREQT−00 and MPREQT−00 and permits sufficient time for checking and multiplexing of request data, address and commands received from the main memory and CPU local bus requestors. A NAND gate 30-24 forces output grant set signal MYDCNS−00 to a binary ZERO at the completion of the local priority resolution cycle (i.e., signal MYREQT+30), in the absence of any current system bus cycle (i.e., signal BSDCNB−20=1) and any current response (i.e., signal MYDCNR−00=1).

Signal MYDCNS−00 is used to set to a binary ONE, a pair of flip-flops 30-300 and 30-302 which make up grant flip-flop 30-30. The negation output signals MYDCNN−00 and MYDCNN−01 are applied to the inverting inputs of an AND gate 30-304 which generates my data cycle now, signal MYDCNN+10. The negation outputs of flip-flops 30-300 and 30-302 are used to avoid spikes or signal glitches. Also, the clock (c) and data (d) inputs of both flip-flops are tied to a voltage +V to reduce spikes or signal glitches. Both flip-flops are reset to binary ZEROS when reset signal MYDCNR−00 is forced to a binary ZERO. Signal MYDCNR−00, when a binary ZERO, also inhibits flip-flops 30-300 and 30-302 from being set. Signal MYDCNR−00 is forced to a binary ZERO when either bus master clear signal BSMCLR−20 or bus response signal BSRESP−20 applied to one of the inverting inputs of NOR gate 30-306 is a binary ZERO. Signal BSRESP−20 is forced to a binary ZERO by a NOR gate 30-308 upon the receipt of any response from system bus 11 (i.e., signal BSACKR+10, BSNAKR+10 or BSWAIT+10=1).

DESCRIPTION OF OPERATION

With reference to FIGS. 1 through 3, the operation of the priority network resolution apparatus of the present invention will now be described relative to the timing diagram of FIG. 4. As previously mentioned, it is one of the main functions of the system bus priority network section 30-10, as well as the other sections of the system bus distributed priority network which form an interface to system bus 11, to resolve he priority of simultaneous requests asynchronously applied from the different units connected to system bus 11 on the basis of the units positioned priority. The manner in which priority is resolved is as described in the previously referenced patents, such as, for example, U.S. Pat. No. 4,559,595.

Associated with each unit's priority network is a grant flip-flop. At any point in time, only one specified grant flip-flop may be set and the unit is deemed the "master" for that specific bus cycle. Each unit may make a user request to use the system bus 11 resulting in the setting of its user or ask flip-flop. Therefore, at any time, many user flip-flops may be set, each representing a request for a future bus cycle. Additionally, each unit connected to system bus 11 has a request flip-flop. The request flip-flops of all units collectively may be viewed as a request register. And, it is the outputs of this request register that supply the distributed bus priority network sections of system bus 11 and establish that only one grant flip-flop will be set no matter how many requests are pending at the time. If there are no requests pending, then no request flip-flops will be set.

In greater detail, the first unit to set its user or ask flip-flop causes its request flip-flop to set. This, in turn, inhibits the other units from setting their request flip-flops after a period of delay. Thus, a number of request flip-flops may be set during this delay period depending upon the arrival of such requests. A particular grant flip-flop is set when the unit associated therewith had set its request flip-flop, and there is no higher priority unit which has requested use of the system bus during the bus cycle.

Thus, during each system bus cycle, there are three identifiable intervals. The first interval is the period of time required to determine the highest priority unit which is to be granted the bus cycle (i.e., the unit which has won the system bus). This interval corresponds to the priority network resolution cycle which starts at the negative going edge of bus request signal BSREQT−00. The interval ends following the amount of asynchronous delay allowed within the system for priority to settle and for the selection of the highest priority unit requesting use of system bus 11.

The next interval is the period during which the master unit calls the slave unit or stated differently transfers the request to system bus 11. This interval starts at the negative going edge of bus data cycle, now signal BSDCNN−00. The transition indicates that the use of system bus 11 has been granted to a master unit. During this interval, the master unit is free to transfer a request to another or slave unit in the form of information applied to the address, data and control lines of system bus 11.

The last interval is the period of time allocated for the response by the slave or receiving unit. This interval begins at the negative going edge of the strobe signal BSDCNB−20 which corresponds to bus signal BSDCND−00. During this interval, the slave unit determines if the address designates such slave unit and stores the address, data and command information applied to the system bus 11. It then begins the process of determining the type of response to be made to the request. The end of the third interval, which is also the end of the bus cycle, corresponds to the point at which the bus data cycle, now signal BSDCNN−00, switches to a binary ONE.

Figure 4:
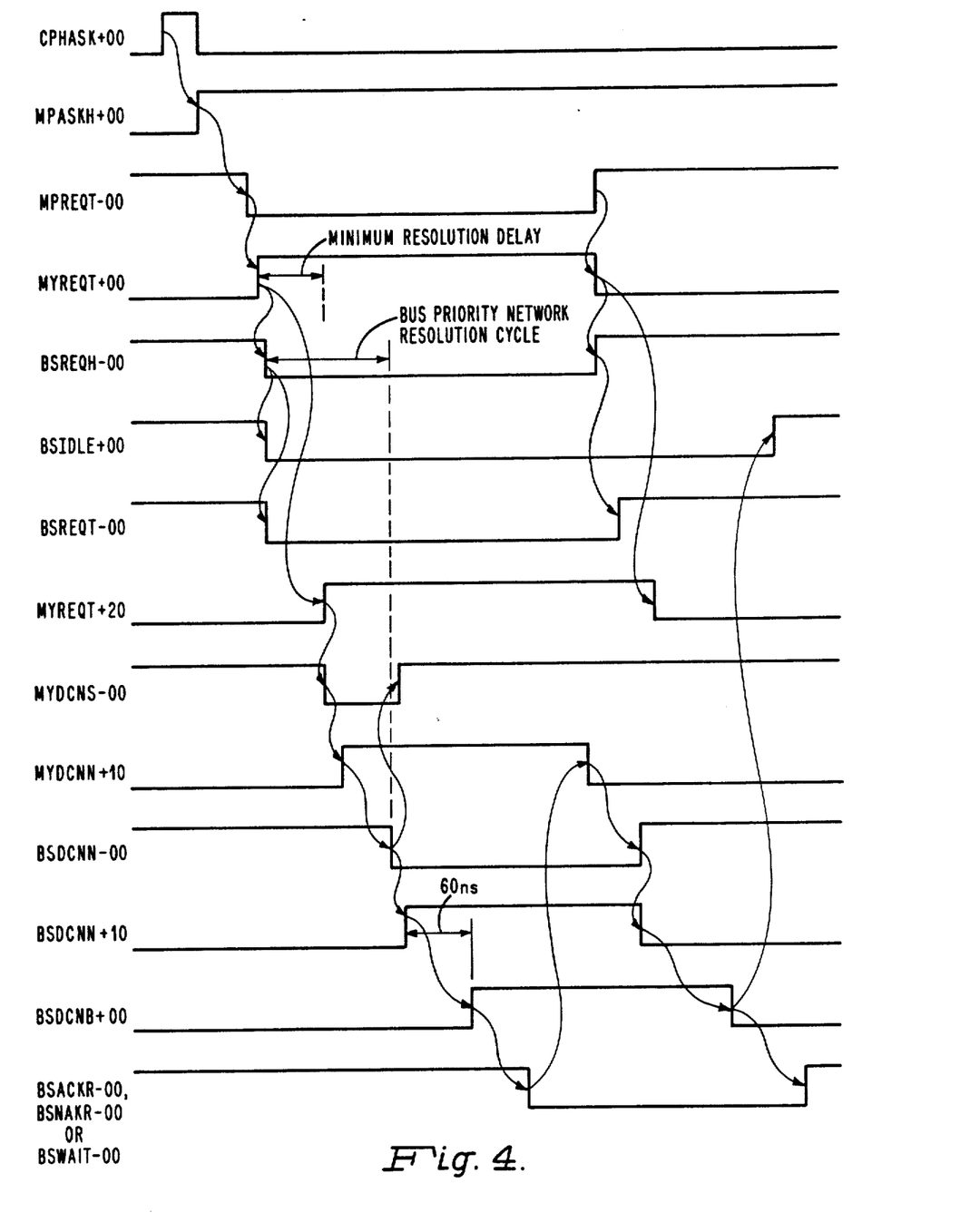
FIG. 4 is a timing diagram used in explaining the operation of the apparatus of the present invention.

The above described intervals are illustrated in FIG. 4. The first interval is the one which is pertinent to the present invention. However, the other intervals are shown to illustrate the overall timing of a bus cycle and the reason that any delay in gaining access to system bus 11 by the local bus units could result in less frequent system bus cycles being granted to such units. The priority resolution apparatus of the present invention permits all local unit requests to be resolved within a single system bus resolution cycle thereby eliminating the possibility of any delay which would result in the loss of system bus cycles by such local units. Additionally, the priority resolution apparatus of the present invention is organized to service requests from any number of user local units which share a common grant flip-flop section.

The manner in which the apparatus of the present invention accomplishes this will now be described relative to the handling of a high priority microprocessor request received from CPU 14 of FIG. 1. At this time, it is assumed that no other units connected to system bus 11 are requesting use of the bus. That is, system bus 11 is in an idle state (i.e., signal BSIDLE+00=1).

Normally, CPU 14 only generates a bus request when it is ready to transmit or receive data to or from one of the I/O units connected to system bus 11. When CPU 14 wants to access data stored on disk controller 32, it generates a bus request on local bus 12. At the same time, CPU 14 forces signal CPHASK+00 to a binary ONE. This causes the request to be loaded into CPU mailbox register 30-40 and high priority request user ask flip-flop 30-150b of FIG. 3 to be set to a binary ONE. As seen from FIG. 4, ASK flip-flop 30-150b forces signal MPASKH+00 to a binary ONE. This results in NAND gate 20-106 of FIG. 3 forcing signal MPREQS−00 to a binary ZERO.

At the appropriate time period established by system bus 11, the request input section 30-100 stores the local user request in the corresponding request flip-flop. Here, this results in the MP request flip-flop 30-102 being switched to a binary ONE. At this time, signal MPREQT−00 is forced to a binary ZERO as shown in FIG. 4. The setting of one of the request flip-flops in request input section 20-100 causes the OR gate 30-200 of the logical OR section to force my request signal MYREQT+00 to a binary ONE. Signal MYREQT+00 is simultaneously applied to system bus 11 via driver circuit 30-50 and to local priority network 30-20.

As seen from FIG. 4, this forces system bus request signal BSREQH-00 from a binary ONE to a binary ZERO which signals the start of a system bus priority network resolution cycle of operation. As mentioned above, the priority network sections comprising the distributed priority bus network of system bus 11 then operate to resolve the relative positional priorities of those units requesting simultaneous access to bus 11.

Since BIU 30 has the highest priority by being positioned at the highest location on system bus 11, it will be granted access to system bus 11 under the control of network 30-10 following the completion of the system bus resolution cycle. It will also be noted that the setting of MP request flip-flop 20-102 causes AND gate 30-318 of priority network section 30-300 to force signal BSMYOK+10 to a binary ZERO. This indicates to controller units 32 and 34 that BIU 30 will be using the next system bus cycle thereby inhibiting such units from using system bus 11 during this time.

As shown in FIG. 4, local priority network 30-20 performs a priority local resolution cycle of operation in parallel with the priority resolution cycle being carried out by the distributed priority network sections of system bus 11. Therefore, when the local bus priority resolution cycle is completed, signal MYDCNS−00 can immediately set to binary ONES shared grant flip-flops 30-300 and 30-302 enabling the transfer of CPU 14 request to system bus 11. That is, it is only after signal MYREQT+20 indicating the completion of the local bus resolution cycle is forced to a binary ONE during the system bus priority resolution cycle (i.e., when signal BSDCNB−20=1) that NAND gate 30-24 forces set grant signal MYDCNS−00 to a binary ZERO. This, in turn, sets both flip-flops 30-300 and 30-302 to binary ONES. Thereafter, AND gate 20-304 forces signal MYDCNN+10 to a binary ONE. The output MYDCNN+10 from the grant flip-flops is applied to the mailbox decode circuits together with the output request signals MMREQT+00 and MPREQT+00. Since these are only two types of local units competing for access, signal MMREQT+00 is only needed to indicate whether or not the local requestor granted the system bus cycle is main memory or a CPU local unit. The signal MMREQT+00 is used to select the appropriate mailbox register containing the request to be transferred to bus 10.

As seen from FIG. 4, signal MYDCNN+10 applied to system bus 11 results in bus data cycle now signal, BSDCNN00 being forced to a binary ZERO signalling the end of the system bus priority resolution cycle. This, in turn, forces BIU bus signal BSDCNN+10 to a binary ONE. After a delay of 60 nanoseconds, OR gate 30-304 forces signal BSDCNB+00 to a binary ONE which clears the priority network circuits for the next system bus resolution cycle.

In addition to being granted bus cycles in response to high priority requests received from any one of the local CPUs, the network 30-10 grants system bus cycles the same as if BIU 30 was positioned as the lowest priority unit on system bus That is, if there are no high or low priority requests to access system bus 11 (i.e., bus signals BSREQH+10 and BSREQL+10=0), and there is no current bus cycle in progress (i.e., signal BSDCNB+00=0), then the next bus cycle and only that bus cycle will be granted. This occurs when one of the CPUs has previously set low priority user ask flip-flop 30-150c to a binary ONE. When the above mentioned conditions are met, the request input section will accept the low priority request from one of the local CPUs by setting MP request flip-flop 30-102 to a binary ONE state. At the end of the system bus resolution cycle, signal MYDCNN−00 causes request flip-flop 30-102 to be reset to a binary ZERO.

It is seen that the apparatus of the present invention provides a most efficient system for ensuring that the requests for access to system bus 11 received from the local requestors are all resolved within the priority resolution cycle of system bus 11. The apparatus maximizes its use of existing circuits of the system bus interface network 30-10. Further, it permits a local CPU to designate how its request is to be processed. This exploits the dual priority bus positioning afforded to BIU 30 and enables important CPU operations to be carried out on a high priority basis thereby eliminating delays.

It also employs an organization which can be readily expanded to accept and resolve the priorities of requests from any number of local bus units. In such instances, the number of request flip-flops included in Request Input Section 30-100 would be expanded to include a request flip-flop for each local CPU or memory user. Also, for accommodating multilevels of simultaneity, each CPU would have its own mailbox addressable by such CPU. The outputs from all of the request flip-flops would be again ORed together by logical OR section 30-200 in the same manner as described above. Additionally, the request flip-flop outputs would be decoded by the mailbox register circuits of each local unit to identify the local unit which was granted access.

It will also be obvious that other changes can be made to the apparatus of the present invention. For example, the grant flip-flops of block 30-30 could be implemented as a single shared flip-flop, different types of circuits could be employed, etc.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A bus resolver used in a data processing system having a plurality of units including a bus interface unit which couples to a plurality of local units which connect in common to a local bus, said plurality of units being coupled to different physical positions along a common system bus for asynchronously transferring requests between different ones of said units, the transferring of requests proceeding on a priority basis controlled by a plurality of like priority network bus interface sections, one of said sections being included in a different one of said plurality of units and in which said sections collectively form a distributed bus priority network of said common system bus for granting priority access on the basis of each unit's physical position on said common system bus relative to one end of said bus as indicated by signals generated by a corresponding one of said priority network sections included in said each unit, said bus resolver comprising:

bus priority resolution circuit means included in one of said plurality of sections which connects to a predetermined position on said bus, said circuit means having a plurality of inputs coupled to receive bus request and timing signals from said common system bus defining when said bus can be accessed and a plurality of outputs, said resolution circuit means generating signals at said outputs in response to said bus request and timing signals for indicating the result of resolving priorities by said distributed bus priority network during a bus resolution cycle of operation between any simultaneous requests made by another one of said plurality of units to use said common system bus;

request input means includes in said one of said plurality of sections, said request input means having a plurality of request storage means coupled to said outputs of said resolution circuit means, each request storage means being coupled to said local bus and each of said request storage means for generating a signal for each different type of requester within a predetermined time interval defined by said signals at said outputs of said resolution circuit means indicating when one of said plurality of local units has a request to be transferred to said common system bus; and logic circuit means coupled to said plurality of request storage means and to said common system bus, said logic circuit means logically combining said signals from each of said plurality of request storage means to produce a resulting request signal on said common system bus to said distributed priority network for signaling a request to access said common system bus on said priority basis; and, local priority resolution circuit means for resolving internally the relative priorities of said plurality of local units, said local priority resolution circuit means directly coupled to said logic circuit means for receiving said resulting request signal simultaneously applied to said local resolution circuit means and to said common system bus, said local priority resolution circuit means in response to said resulting request signal generating an output signal within a predetermined minimum amount of time established by said local priority resolution circuit means during said bus resolution cycle of operation for signaling to said local unit designated by said request input means that it is the highest priority local unit requesting access to said common system bus and has been granted said access.

2. The bus resolver of claim 1 wherein said bus resolver further includes:
a plurality of user storage means, each user storage means having an input and an output, said input being connected to said local bus for receiving signals indicative of said requests from said different one of said plurality of local units and said output being connected to one of said plurality of request storage means; and
a plurality of mailbox register means, each mailbox register means being connected to said local bus for receiving said requests from said one of said predetermined type of local unit.

3. The bus resolver of claim 2 wherein said plurality of local units includes a number of central processing units and a number of memory units, said input of a first one of said plurality of user storage means being connected in common to each of said number of central processing units and said input of a second one of said plurality of user storage means being connected in common to said number of memory units for enabling the sharing of corresponding ones of said plurality of mailbox register means by said numbers of said central processing units and said memory units.

4. The bus resolver of claim 3 wherein said input of a third one of said plurality of user storage means is connected in common to each of said number of central processing units, each of said number of central processing units selecting said first and second ones of said plurality of user storage means for designating high and low priority processing respectively of the request loaded into said corresponding one of said mailbox register means.

5. The bus resolver of claim 4 wherein each of said number of central processing units and memory units is at least two.

6. The bus resolver of claim 4 wherein each of said plurality of user storage means includes a bistable device.

7. The bus resolver of claim 2 wherein said plurality of local units includes a plurality of central processing units and a number of main memory units, said plurality of request storage means including a first group of bistable devices, each bistable device being connected to a different one of said plurality of central processing units and a second group of bistable devices, each connected to a different one of said number of main memory units, each bistable device of said first and second groups being connected to operate in conjunction with a different one of said pluralities user storage means and mailbox register means.

8. The bus resolver of claim 1 wherein said logic circuit means consists of an OR circuit.

9. The bus resolver of claim 1 wherein said local priority resolution circuit includes:
an AND gate having a plurality of inputs and an output, a first one of said inputs being connected to receive said resulting request signal and said output providing said output signal; and
a delay circuit having an input and an output, said input being connected to receive said resulting request signal, said delay circuit generating on said output said resulting request signal delayed by said predetermined minimum of time and said delay circuit output being connected to another one of said plurality of inputs of said AND gate for enabling said AND gate within said predetermined minimum of time.

10. The bus resolver of claim 1 wherein said local bus is a synchronously operated bus which has a cycle of operation substantially shorter than the cycle of operation of said common system bus.

11. The bus resolver of claim 1 wherein said resolver further includes grant indicator means having an input and an output, said input being connected to said local priority resolution circuit means and said output being connected to said common system bus, said grant indicator means being enabled by said output signal from said local priority resolution circuit means to generate a signal on said common system bus for signalling the start of a next interval of the bus cycle of operation during which said request of said highest priority local unit is applied to said common system bus by said one of said local units sharing said grant indicator means.

12. The bus resolver of claim 2 wherein said bus resolver further includes means for directly connecting at least a selected one of said plurality of request storage means to said plurality of mailbox register means, said means for directly connecting enabling said request of said highest priority local unit designated by said request input means to be applied to said common system bus.

13. The bus resolver of claim 4 wherein said bus interface unit is connected to a high priority end of said common system bus, said bus priority resolution circuit means further including:

detector means connected to said common system bus, said detector means in response to said bus request signals generating a signal for indicating when said common system bus is in an idle condition, said detector means being connected to said request input means, said request means being enabled by said signal from said detector means to generate said signal indicating when one of said central processing units has a low priority request to be transferred to said common system bus for processing during said idle condition.

14. A data processing system having an asynchronously common system bus to which a plurality of units are coupled to different physical positions along said common system bus for asynchronously transferring requests between said units, each unit including a system bus priority network, said system further including a bus interface unit which couples to one end of said common system bus and to a plurality of local units connected in common to a high speed synchronous local bus, said bus interface unit including a system bus priority network which collectively with said system bus priority network of each of said plurality of units form a distributed bus priority network of said common system bus for granting access to said common system bus on a priority basis defined by each unit's position on said bus relative to said one end of said bus, said bus interface unit further including bus resolver apparatus comprising:

bus priority resolution circuit means having a plurality of inputs coupled to receive bus request and timing signals from said common system bus defining when said common system bus can be accessed and a plurality of outputs, said resolution circuit means generating signals at said outputs in response to said bus request and timing signals indicating the result of resolving priorities by said distributed bus priority network during a bus resolution cycle of operation between any simultaneous requests made by another one of said plurality of units to use said common system bus;

request input means having a plurality of request storage means corresponding in number to a number of different types of requests to be processed, said plurality of request storage means being connected to said outputs of said bus resolution circuit means, each request storage means being coupled to said local bus and each of said request storage means generating a signal during a predetermined interval defined by said signals at said outputs of said bus priority resolution circuit means indicating when one of said local units has a one of said number of different types of requests to be transferred to said common system bus;

logic circuit means coupled to said plurality of request storage means and to said common system bus, said logic circuit means logically combining said signals from each of said plurality of request storage means so as to produce an output request signals on said common system bus for signaling a request to access said common storage bus for processing by said distributed bus priority network; and, local priority resolution circuit means for resolving internally the relative priorities of said local units requesting access to said common system bus, said local priority resolution circuit means being directly coupled to said logic circuit means for receiving said output request signal simultaneously applied to said local resolution circuit means and to said common system bus, said local priority resolution circuit means in response to said output request signal generating an output signal within a predetermined minimum amount of time established by said local priority resolution circuit means required for local unit priority resolution during said bus resolution cycle of operation for signalling to said local unit designated by said plurality of request storage means as being the highest priority local unit and having the highest priority of said plurality of units requesting access to said common system bus and that said access to said common system bus has been granted.

15. The bus resolver apparatus of claim 14 wherein said bus resolver circuit further includes:
a plurality of user storage means, each user storage means having an input and an output, said input being connected to said local bus for receiving signals indicative of said request received from one of said plurality of local units and said output being connected to one of said plurality of request storage means; and
a plurality of mailbox register means, each mailbox register means being connected to said local bus for receiving said requests from said one of said local units.

16. The bus resolver apparatus of claim 15 wherein said plurality of local units includes a number of central processing units and a number of memory units, said input of a first one of said plurality of user storage means being connected in common to each of said number of central processing units and said input of a second one of said plurality of user storage means being connected in common to said number of memory units for enabling the sharing of corresponding ones of said plurality of mailbox register means by said numbers of said central processing units and said memory units.

17. The bus resolver apparatus of claim 16 wherein said input of a third one of said plurality of user storage means is connected in common to each of said number of central processing units, each of said number of central processing units being connected for selecting said first and second ones of said plurality of user storage means as a function of the priority required for processing the request loaded into said corresponding one of said mailbox register means.

18. The bus resolver apparatus of claim 17 wherein said first and said third ones of said user storage means is selected by each of said processing units for processing high and low priority requests respectively.

19. The bus resolver apparatus of claim 17 wherein each of said number of central processing units and memory units is at least two.

20. The bus resolver apparatus of claim 17 wherein each of said plurality of user storage means includes a bistable device.

21. The bus resolver apparatus of claim 15 wherein said plurality of local units includes a plurality of central processing units and a number of main memory units, said plurality of request storage means including a first group of bistable devices, each bistable device being connected to a different one of said plurality of central processing units and a second group of bistable devices, each connected to a different one of said number of main memory units, each bistable device of said first and second groups being connected to operate in conjunction with a different one of said pluralities user storage means and mailbox register means.

22. The bus resolver apparatus of claim 14 wherein said logic circuit means consists of an OR circuit.

23. The bus resolver apparatus of claim 14 wherein said local priority resolution circuit includes:
   an AND gate having a plurality of inputs and an output, a first one of said inputs being connected to receive said resulting request signal and said output providing said output signal; and
   a delay circuit having an input and an output, said input being connected to receive said resulting request signal, said delay circuit generating on said output said resulting request signal delayed by said predetermined minimum of time and said delay circuit output being connected to another one of said plurality of inputs of said AND gate for enabling said AND gate within said predetermined minimum of time.

24. The bus resolver apparatus of claim 14 wherein said local bus is a synchronously operated bus which has a cycle of operation substantially shorter than the cycle of operation of said common system bus.

25. The bus resolver apparatus of claim 14 wherein said resolver further includes grant indicator means having an input and an output, said input being connected to said local priority resolution circuit means and said output being connected to said common system bus, said grant indicator means being enabled by said output signal from said local priority resolution circuit means to generate a signal on said common system bus for signalling the start of a next interval of the bus cycle of operation during which said request of said highest priority local unit is applied to said common system bus by said one of said local units sharing said grant indicator means.

26. The bus resolver apparatus of claim 15 wherein said bus resolver further includes means for directly connecting at least a selected one of said plurality of request storage means to said plurality of mailbox register means, said means for directly connecting enabling said request of said highest priority local unit designated by said request input means to be applied to said common system bus.

27. The bus resolver apparatus of claim 17 wherein said bus interface unit is connected to the high priority end of said common system bus, said bus priority resolution circuit means further including:
   detector means connected to said common system bus, said detector means in response to said bus request signals generating a signal for indicating when said common system bus is in an idle condition, said detector means being connected to said request input means, said request means being enabled by said signal from said detector means to generate said signal indicating when one of said central processing units has a low priority request to be transferred to said common system bus for processing during said idle condition.

28. A method for processing requests received from a plurality of local units which connect in common to a high speed synchronous local bus, for transfer to a common system bus to which a plurality of units couple to different physical positions along said common system bus for asynchronously transferring requests between said plurality of units on a priority basis controlled by a plurality of like priority networks connected between said units and said common system bus which collectively form a distributed bus priority network, each unit being granted access to said common system bus by said priority network on the basis of said unit's physical position on said bus relative to one end of said bus, said method comprising the steps of:
   (a) positioning a bus interface unit between said one end of said common system bus and said synchronous local bus for receiving said requests from said local units to be transferred to said common system bus;
   (b) receiving bus request and timing signals from said common system bus defining when said common system bus can be accessed by a priority network included in said bus interface unit which is included as part of said distributed bus priority network for granting access on said priority basis to use said common system bus;
   (c) generating output signals in response to said bus request and timing signals by said priority network indicating the result of resolving priorities by said distributed bus priority network during a bus resolution cycle of operation between any simultaneous request made by another one of said plurality of units and said bus interface unit to use said common system bus;
   (d) generating a request signal within a predetermined interval defined by said output signals generated in step (c) in response to each different type of request received from each local unit indicating a desire to use said common system bus;
   (e) logically combining each of the locally generated request signals produced in step (d) during said predetermined interval to produce an output request signal;
   (f) applying said output request signal to said common system bus for resolution by said distributed bus priority network with any other requests applied to said common system bus by said plurality of units during said bus resolution cycle of operation; and,
   (g) simultaneously applying said output request signal in parallel with step (f) to a local priority network for resolution of relative priorities of different types of local requests within a minimum amount of time established by said local priority network so as to ensure that said local units are always granted access to said common system bus within said bus resolution cycle of operation.

29. The method of claim 28 wherein said step (c) of said method further includes the steps of:
   specifying whether said each different type of local unit request is a high or low priority request;
   detecting when said common system bus is in an idle state as defined by one of said output signals; and
   generating said request signal for each low priority request for enabling said local unit to access said common system bus during said idle state for a single bus cycle of operation.

30. The method of claim 28 wherein said method further includes the step of:
   decoding locally generated request signals for identifying the highest priority local unit granted access to said common system bus.

* * * * *